United States Patent
Moyal et al.

(10) Patent No.: US 12,450,364 B2
(45) Date of Patent: Oct. 21, 2025

(54) SELECTIVE ENCRYPTION WHILE LOADING FROM NETWORK ATTACHED STORAGE SYSTEM

(71) Applicant: INTERNATIONAL BUSINESS MACHINES CORPORATION, Armonk, NY (US)

(72) Inventors: Shailendra Moyal, Pune (IN); Sarbajit K. Rakshit, Kolkata (IN); Partho Ghosh, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 17/819,683

(22) Filed: Aug. 15, 2022

(65) Prior Publication Data

US 2024/0054236 A1    Feb. 15, 2024

(51) Int. Cl.
G06F 21/60    (2013.01)
G06F 16/28    (2019.01)

(52) U.S. Cl.
CPC .......... *G06F 21/602* (2013.01); *G06F 16/285* (2019.01)

(58) Field of Classification Search
CPC ....... G06F 21/602; G06F 16/285; H04L 63/00
See application file for complete search history.

(56) References Cited

U.S. PATENT DOCUMENTS

| | | | | |
|---|---|---|---|---|
| 9,614,670 | B1* | 4/2017 | Ghetti | H04L 63/065 |
| 11,393,046 | B1* | 7/2022 | McCluskey | G06F 21/6227 |
| 2007/0101123 | A1* | 5/2007 | Kollmyer | H04N 21/8193 |
| | | | | 348/E7.056 |
| 2013/0246808 | A1* | 9/2013 | Orsini | H04L 67/1097 |
| | | | | 713/189 |
| 2014/0032925 | A1* | 1/2014 | Panchbudhe | G06F 21/602 |
| | | | | 713/189 |
| 2015/0365382 | A1* | 12/2015 | Balakrishnan | H04L 67/1097 |
| | | | | 713/168 |
| 2016/0021109 | A1* | 1/2016 | Jueneman | H04L 9/3226 |
| | | | | 713/165 |
| 2016/0306984 | A1* | 10/2016 | Amarendran | G06N 5/02 |
| 2017/0053125 | A1* | 2/2017 | Savagaonkar | G06F 21/60 |
| 2017/0063525 | A1* | 3/2017 | Bacon | H04L 9/008 |

(Continued)

OTHER PUBLICATIONS

Lookabaugh, Tom, and Douglas C. Sicker. "Selective encryption for consumer applications." IEEE communications magazine 42.5 (2004): 124-129.*

(Continued)

*Primary Examiner* — Jimmy H Tran
(74) *Attorney, Agent, or Firm* — Michael O'Keefe (57) ABSTRACT

According to one embodiment, a method, computer system, and computer program product for selective dataset encryption is provided. The embodiment may include identifying one or more data items within one or more datasets to be moved from network attached storage to cloud-based storage. The embodiment may also include determining an encryption method to be performed on each data item based on a level of confidentiality or sensitivity of each data item. The embodiment may further include sorting each data item into one or more groups based on the determined encryption method. The embodiment may also include performing each determined encryption method to the corresponding group.

20 Claims, 3 Drawing Sheets

(56) References Cited

U.S. PATENT DOCUMENTS

| | | | | |
|---|---|---|---|---|
| 2017/0093573 | A1* | 3/2017 | Androulaki | G06F 16/1752 |
| 2017/0262645 | A1* | 9/2017 | Gupta | G06F 21/6218 |
| 2018/0032446 | A1* | 2/2018 | Amarendran | G06N 5/02 |
| 2018/0232527 | A1* | 8/2018 | Haager | H04L 63/0428 |
| 2018/0248887 | A1* | 8/2018 | Sayed | H04L 63/105 |
| 2018/0309739 | A1* | 10/2018 | Kumhyr | G06F 21/6218 |
| 2019/0005248 | A1* | 1/2019 | Krishnamurthy | H04L 63/0428 |
| 2019/0075087 | A1* | 3/2019 | Baig | H04L 9/0618 |
| 2019/0253237 | A1* | 8/2019 | Jezewski | H04L 9/14 |
| 2020/0177370 | A1* | 6/2020 | Jordan | G06F 21/602 |
| 2020/0204361 | A1* | 6/2020 | Fries | H04L 9/3271 |
| 2020/0344295 | A1* | 10/2020 | Lindeman | H04L 67/1097 |
| 2021/0097894 | A1* | 4/2021 | Iyer | G09C 1/00 |
| 2021/0150038 | A1* | 5/2021 | Valecha | H04L 9/3268 |
| 2021/0344485 | A1* | 11/2021 | Levin | H04L 9/0825 |
| 2022/0103339 | A1* | 3/2022 | Brooker | H04L 9/0637 |
| 2022/0191024 | A1* | 6/2022 | Liu | H04L 9/088 |
| 2022/0292221 | A1* | 9/2022 | Sohail | H04L 63/105 |
| 2022/0405416 | A1* | 12/2022 | Liu | G06F 21/602 |
| 2023/0108423 | A1* | 4/2023 | Wisgo | H04L 63/108 713/165 |
| 2023/0185934 | A1* | 6/2023 | Seilnacht | G06F 21/602 726/27 |
| 2023/0224159 | A1* | 7/2023 | Meena | H04L 9/3213 713/193 |
| 2023/0259640 | A1* | 8/2023 | Metzler | G06F 21/6218 713/191 |
| 2023/0336327 | A1* | 10/2023 | Lu | H04L 9/008 |
| 2023/0421351 | A1* | 12/2023 | Yampolsky | H04L 9/008 |

OTHER PUBLICATIONS

Derler, David, et al. "Bloom filter encryption and applications to efficient forward-secret 0-RTT key exchange." Journal of Cryptology 34 (2021): 1-59.*

Author Unknown, "Loading CSV data from Cloud Storage," Google Cloud, Accessed: May 17, 2022, https://cloud.google.com/bigquery/docs/loading-data-cloud-storage-csv, 21 pages.

Author Unknown, "Loading data to IBM Cloud," IBM, Sep. 28, 2021, https://www.ibm.com/docs/en/db2woc?topic=data-loading-cloud, 4 pages.

Author Unknown, "What is a NAS device and how does it work?," ioSafe, Accessed: May 17, 2022, https://iosafe.com/data-protection-topics/what-is-a-nas-device/, 8 pages.

Author Unknown, "What is network-attached storage?," Red Hat, Mar. 8, 2018, https://www.redhat.com/en/topics/data-storage/network-attached-storage, 9 pages.

Buurst Staff, "Moving your on-Premises NAS to the Azure Cloud," Buurst, Accessed: May 17, 2022, https://www.puurst.com/2016/06/06/on-premise-nas-azure-cloud/, 15 pages.

Horandner et al., "Selective end-to-end data-sharing in the cloud," Journal of Banking and Financial Technology (2020) 4, Jul. 2, 2020, https://link.springer.com/article/10.1007/s42786-020-00017-y, pp. 139-157.

Mell et al., "The NIST Definition of Cloud Computing", National Institute of Standards and Technology, Special Publication 800-145, Sep. 2011, 7 pages.

* cited by examiner

SELECTIVE ENCRYPTION WHILE LOADING FROM NETWORK ATTACHED STORAGE SYSTEM

BACKGROUND

The present invention relates generally to the field of computing, and more particularly to data encryption.

Encryption is a method of data conversion that encodes information to provide protection while the data is in transit from a source to a destination storage location. Unencrypted data, or plaintext, is generally converted to encrypted data, or ciphertext, to secure the data and maintain confidentiality, authentication, integrity, and nonrepudiation. To encrypt data, an algorithm, or cipher, is used to convert information from plaintext to ciphertext. Encryption itself does not prevent data from being intercepted while in transit. However, encryption provides a level of security that the intercepting party will not be able to access the data items within due to the intercepting party not being in possession of the key needed to decrypt the data.

Encryption and decrypting rely on the usage of keys to transition data from unencrypted to encrypted and back again. There are two main types of encryption keys: symmetric keys and public keys, or asymmetric keys. Several branches of public key encryption have emerged including Rivest-Shamir-Adleman (RSA), Diffie-Hellman, and Pretty Good Privacy (PGP). The strength of data encryption relies upon the key length used to encrypt the plaintext data. Modern encryption standards utilize various keys sizes of 56-bits, 128-bits, 256-bits, or 512-bits. As is expected, the larger the key size, typically, the stronger level of encryption results.

SUMMARY

According to one embodiment, a method, computer system, and computer program product for selective dataset encryption is provided. The embodiment may include identifying one or more data items within one or more datasets to be moved from network attached storage to cloud-based storage. The embodiment may also include determining an encryption method to be performed on each data item based on a level of confidentiality or sensitivity of each data item. The embodiment may further include sorting each data item into one or more groups based on the determined encryption method. The embodiment may also include performing each determined encryption method to the corresponding group.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to data encryption. The following described exemplary embodiments provide a system, method, and program product to, among other things, identify, group, and encrypt data items in a repository in need of encryption based on the encryption type necessary for the confidentiality level of each data item. Therefore, the present embodiment has the capacity to improve the technical field of data encryption by improving encryption times and reducing encryption costs for a data set by encrypting information on a more granular level rather than the entire data set as well as utilizing various encryption methods for specific items within the data set.

As previously described, encryption is a method of data conversion that encodes information to provide protection while the data is in transit from a source to a destination storage location. Unencrypted data, or plaintext, is generally converted to encrypted data, or ciphertext, to secure the data and maintain confidentiality, authentication, integrity, and nonrepudiation. To encrypt data, an algorithm, or cipher, is used to convert information from plaintext to ciphertext. Encryption itself does not prevent data from being intercepted while in transit. However, encryption provides a level of security that the intercepting party will not be able to access the data items within due to the intercepting party not being in possession of the key needed to decrypt the data.

Encryption and decrypting rely on the usage of keys to transition data from unencrypted to encrypted and back again. There are two main types of encryption keys: symmetric keys and public keys, or asymmetric keys. Several branches of public key encryption have emerged including Rivest-Shamir-Adleman (RSA), Diffie-Hellman, and Pretty Good Privacy (PGP). The strength of data encryption relies upon the key length used to encrypt the plaintext data. Modern encryption standards utilize various keys sizes of 56-bits, 128-bits, 256-bits, or 512-bits. As is expected, the larger the key size, typically, the stronger level of encryption results. However, due to advances in computing technology, some encryption methods once thought to be secure are no longer such. For example, the original data encryption standard for keys of 56-bits (i.e., $2^{56}$ possible combinations) is no longer secure from a brute force attack using modern computing power. The emerging technology of quantum computers has also exacerbated the need for stronger encryption techniques.

With a need for stronger encryption comes the unintended consequence of longer encryption times. Typically, a more secure method of encryption results in the process of encryption taking longer, and costing more, to perform as plaintext is converted to ciphertext in a manner that is increasingly difficult for modern computers to perform without the necessary key. However, not all data requires the same level of encryption based on the content of the data being encrypted.

In the situation of an on-premises storage system, the need to transmit data to a cloud-based system may be needed at times. To execute this operation, data may be extracted from respective tables on the on-premises database server and stored in text or comma-separated value (CSV) files. The text or CSV files may be stored in network attached storage (NAS) temporarily before transfer to a cloud-based storage system. A NAS is a data storage device that connects to and is accessed through a network rather than directly connecting to a computing device. NAS devices contain a process and an operating system so applications can be executed and needed intelligence (e.g., processing power) for sharing files by authorized users. However, in many on-premises database tables, both confidential and non-confidential data can be stored together. Since different datasets within the same table may have different levels of confidentiality, an issue arises when a desire to transmit the table to cloud-based storage arises as, if every dataset within the table were to be encrypted, the encryption and decryption cost will be increased when encryption and decryption are only truly necessary for certain datasets in the table. As such, it may be advantageous to, among other things, separate data within the dataset into subsets and perform the specific encryption, in any, on each subset.

According to at least one embodiment, data within an on-premises database table may be parsed using natural language techniques to identify information within the table that contains confidential information and the level of confidentiality of each confidential data item. Although the terms, confidential and non-confidential are used throughout, in one or more embodiments, sensitive information (e.g., personal information, business information, classified information, etc.) and the level of sensitivity may also be identified. Upon parsing, each confidential data item may be isolated (or removed) from the table as a whole and separated into different groups based on the level of confidentiality. Encryption of each group may be performed using an encryption method appropriate to secure data with the specific level of confidentiality of each group. The encrypted datasets may then be transmitted through a network to the intended destination location. Upon arrival at the location destination (e.g., a cloud server blob storage), the encrypted dataset may be decrypted and inserted back to the respective tables from which they were removed on the source computer.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
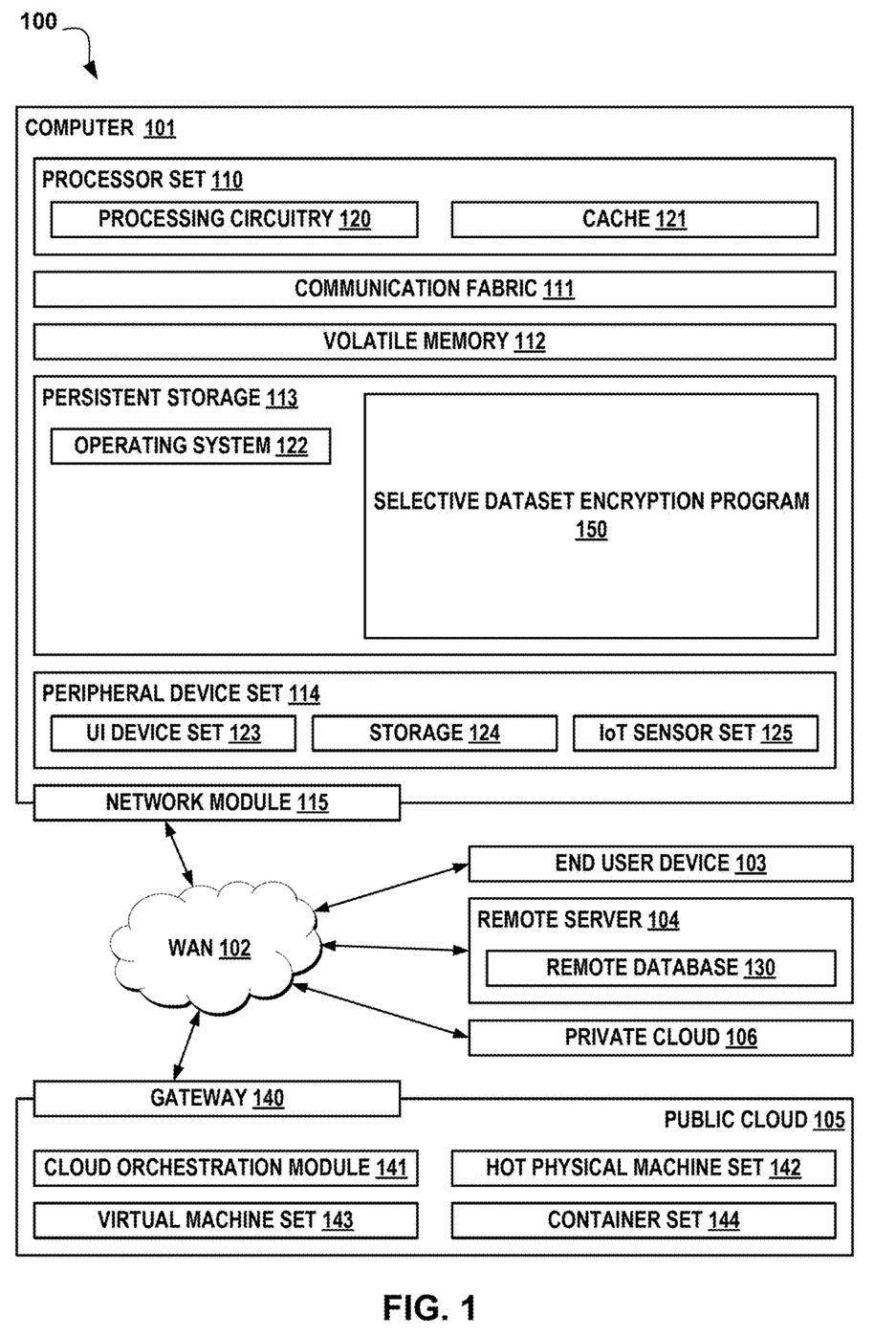
FIG. 1 illustrates an exemplary networked computer environment according to at least one embodiment.

Referring now to FIG. 1, computing environment 100 contains an example of an environment for the execution of at least some of the computer code involved in performing the inventive methods, such as selective dataset encryption program 150. In addition to selective dataset encryption program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, selective dataset encryption program 150 may parse one or more tables stored on a NAS, such as computer 101, and identify one or more data items or datasets within the parsed tables that contain confidential information. The selective dataset encryption program 150 may further identify a level of confidentiality of each item or dataset, group data items or data sets together based on the level of confidentiality, and encrypt each group using an encryption method deemed secure for the corresponding level of confidentiality. As previously described, the selective dataset encryption program 150 may also, or in the alternative, identify whether data within a data set is sensitive data and the level of sensitivity of that data. Sensitive data may include, but is not limited to, personal information, or personally identifiable information (PII); business information; or government-classified information. PII is any data item that can be used to identify an individual. PII may include, but are not limited to, social security numbers, passport numbers, driver's license numbers, taxpayer identification numbers, patient identification numbers, financial account numbers or credit card numbers, home address information, email addresses, personal telephone numbers, internet protocol addresses, login IDs, social media usernames, digital images, geolocation data, biometrics, behavioral data, employee data, academic data, medical and health data, proprietary or copyrighted data, confidential legal or financial data, account numbers, account balances, loan applications, and credit card or debit card applications. Furthermore, notwithstanding depiction in computer 101, selective dataset encryption program 150 may be stored in and/or executed by, individually or in any combination, end user device 103, remote server 104, public cloud 105, and private cloud 106. The selective dataset encryption method is explained in more detail below with respect to FIG. 2.

Figure 2:
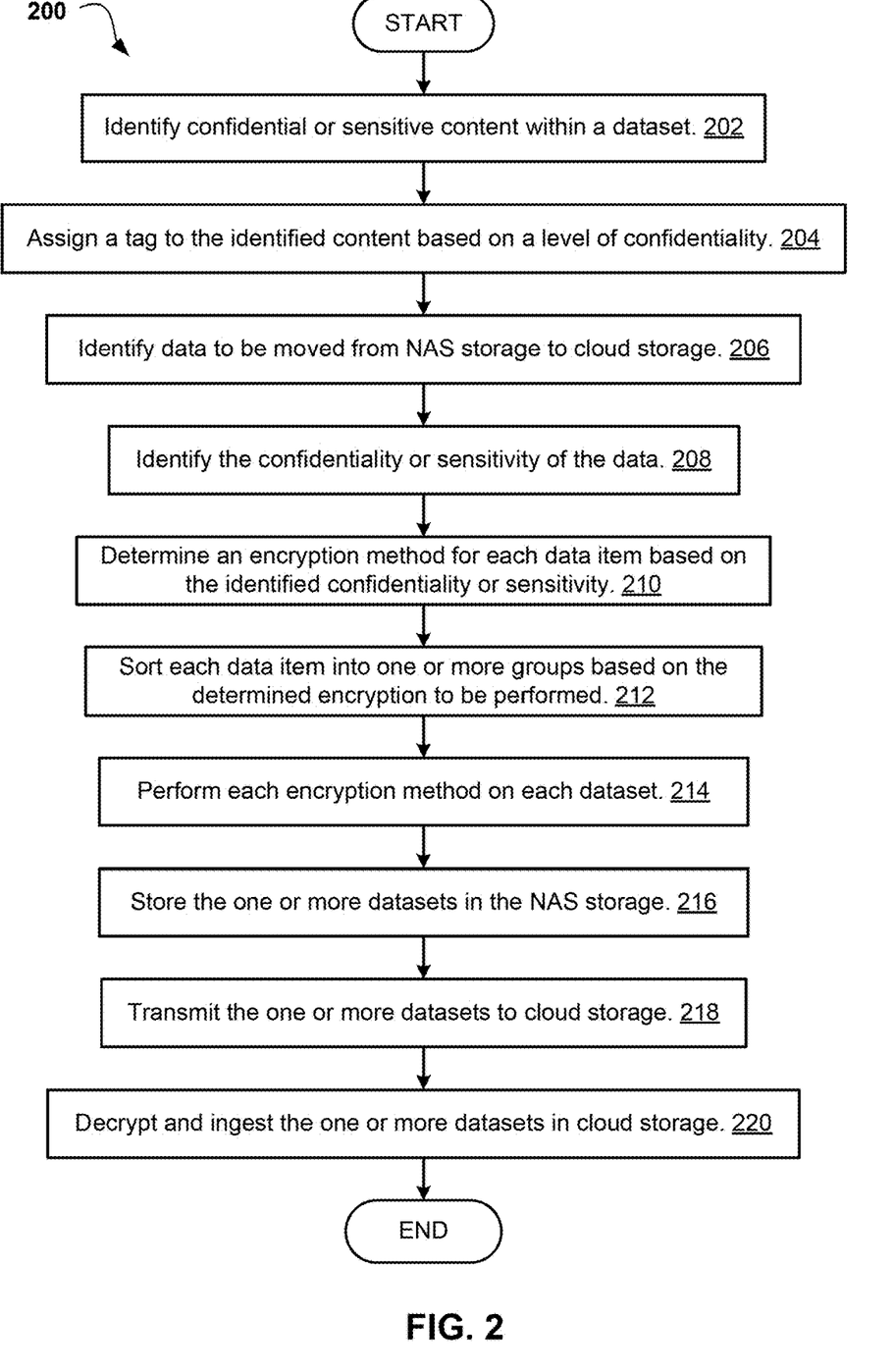
FIG. 2 illustrates an operational flowchart for a selective data encryption process according to at least one embodiment.

Referring now to FIG. 2, an operational flowchart for a selective dataset encryption process 200 is depicted according to at least one embodiment. At 202, the selective dataset encryption program 150 identifies confidential or sensitive information within a dataset. A dataset may be any collection of data either within a table, or other repository of data, or standing alone. Furthermore, the dataset, or the entity containing the dataset, may be structured or unstructured. Based on the nature of the data within the dataset, the data may be representative of confidential or sensitive information. As such, the selective dataset encryption program 150 may identify which data items within the dataset contain confidential or sensitive information. Such identification may be performed using natural language techniques. Once a data item within a data set is determined to contain, or be representative of, confidential or sensitive information, the selective dataset encryption program 150 may place a metadata tag on each data item identified as representing confidential or sensitive information. For example, if the selective dataset encryption program 150 determines a data table contains a column of information that displays individual medical information, the selective dataset encryption program 150 may determine that the column displays confidential or sensitive information and accordingly place a metadata tag on each data item or the column.

In at least one embodiment, once a data item within a dataset is identified as being confidential or sensitive, the selective dataset encryption program 150 may extract the data item from the dataset so as to remove all confidential or sensitive information from the dataset. The selective dataset encryption program 150 may tag, in the metadata for each removed data item, the location from which the data item was extracted in the dataset. Tagging the extraction location may properly allow the selective dataset encryption program 150 to reassemble the dataset upon decryption of each data item as described with respect to step 220.

Furthermore, the selective dataset encryption program 150 may determine a level of confidentiality or sensitivity of each data item determined to display confidential or sensitive information, respectively. Various datasets may contain varying degrees of confidential or sensitive information and, information deemed to be more confidential or sensitive, may warrant a higher level of encryption. Additionally, various data types may require different encryption standards. For example, RSA encryption, although in widespread use, is typically very slow and not suitable for information needing fast transmission, such as internet web traffic. Due to its nature, the level of confidentiality or sensitivity of structured data may already be present within the tagged metadata. However, the selective dataset encryption program 150 may analyze each data item in the dataset, structured or unstructured, to determine whether the level of confidentiality or sensitivity exists and, if not, identify the proper level of confidentiality or sensitivity. Utilizing analysis techniques, such as natural language processing and image processing, the selective dataset encryption program 150 may identify the level of confidentiality or sensitivity of each data item in a dataset. For example, a dataset of unstructured data, such as an email, may contain an individual's full name, home address, and email address. The selective dataset encryption program 150 may determine that the individual's full name, home address, and email address are confidential or sensitive in nature, determine a level of confidentiality or sensitivity associated with each category, and tag the metadata of each data item or the dataset with the determined level.

Then, at 204, the selective dataset encryption program 150 assigns a tag to the identified confidential or sensitive content based on a level of confidentiality and/or a level of sensitivity. Similar to a tag assigned to the metadata of data items deemed to contain confidential or sensitive information, the selective dataset encryption program 150 may assign a tag to a data item deemed confidential or sensitive that indicate the level of confidentiality or sensitivity of the data item. The level of confidentiality or sensitivity may be a value or category indicating the degree to which a data item is confidential or sensitive. For example, in at least one embodiment, the level may be a range from one to ten. However, in another embodiment, the level may include categories labeled as "low", "medium", or "high".

Next, at 206, the selective dataset encryption program 150 identifies data to be moved from a NAS to cloud storage. The selective dataset encryption program 150 may identify data to be transferred to cloud storage through a variety of ways. For example, a user may transfer files to a designated folder, or through some other interaction with a graphical user interface, that beings an upload process to cloud-based storage, such as remote server 104, public cloud 105, or private cloud 106. Similarly, the selective dataset encryption program 150 may periodically upload data to cloud-based storage on a preconfigured schedule. In at least one embodiment, the selective dataset encryption program 150, at the time a trigger to move data to from a NAS to cloud storage is satisfied, may execute a batch job to extract the data stored in the NAS. The identification of the data to be uploaded may also be preconfigured, such as data that does not currently exist on the cloud-based storage or data that has been modified since the previous upload.

Then, at 208, the selective dataset encryption program 150 identifies the confidentiality or sensitivity of the data. While extracting the data from the NAS through the automated extraction process, the selective dataset encryption program 150 may evaluate and identify the confidentiality and/or sensitivity of the different portions of data. The selective dataset encryption program 150 may make the determination as to the confidentiality or sensitivity of the data through utilization of an extraction engine that uses natural language processing or tag-based identification. For example, in a situation where metadata has been previously tagged with the presence of confidential or sensitive data and the level of the confidential or sensitive data, the selective dataset encryption program 150 may identify the confidentiality or sensitivity of the data to be uploaded to cloud-based storage through detection of the appropriate metadata tags. However, in a situation where no metadata tagging has taken place, the selective dataset encryption program 150 may utilize natural language processing techniques to determine the confidentiality or sensitivity of the data in real-time.

Next, at 210, the selective dataset encryption program 150 determines an encryption method for each data item based on the identified confidentiality or sensitivity. Depending on the level of confidentiality or sensitivity of each data item, the selective dataset encryption program 150 may determine a different encryption method is appropriate for encrypting the data item in preparation for transmission to cloud-based storage. The selective dataset encryption program 150 may choose an appropriate encryption method based on various criteria including, but not limited to, performance limitations of each encryption method in relation to the data to be encrypted, legal or industrial regulations that require certain methods of encryption, and individual user preferences and preconfigurations. The selective dataset encryption program 150 may select, or prompt a user to select, one of DES, AES, or RSA encryption. Despite DES, AES, and RSA being expressly listed, the selective dataset encryption program 150 may select any encryption method now known or to be developed in the future capable of encrypting the identified confidential or sensitive data. In at least one embodiment, the selective dataset encryption program 150 may utilize an artificial intelligence system to select the encryption method most suitable for encrypting each dataset based on the above criteria.

Then, at 212, the selective dataset encryption program 150 sorts each data item into one or more groups based on the determined encryption to be performed. Once an encryption method has been determined for each data item, the selective dataset encryption program 150 may sort, or categorize, each data item together with other data items determined to need the same encryption method. For example, if five data items are identified as confidential and/or sensitive and two are determined to need 3DES encryption and three are determined to need AES encryption, the two data items to receive 3DES encryption will be grouped together and the three data items to receive AES encryption will be grouped together.

Next, at 214, the selective dataset encryption program 150 performs each encryption method on each dataset. Upon grouping each data item according to step 212, the selective dataset encryption program 150 may commence the encryption process for each grouped data item according to the determined encryption method for the specific group. To continue the previous example, the selective dataset encryption program 150 may perform 3DES encryption for each data item grouped together in a set of data items determined to received 3DES encryption.

Then, at 216, the selective dataset encryption program 150 stores the one or more datasets in the NAS. Once encrypted according to the determined encryption methods, the selective dataset encryption program 150 may store the data items with various levels of encryption in the NAS while keeping an appropriate naming structure for each encrypted data item. In a NAS, there may be multiple files stored for different file types of source feed. For different source feeds, different names may be provided. Since various files may be split based on the confidentiality and/or sensitivity of the data within the file or dataset, an appropriate naming structure for the various grouped datasets may be necessary. For example, if a dataset is titled dataset_08092022.csv, the selective dataset encryption program 150 may isolate out the various data items within the dataset according to steps 202 through 214 described above and store the encrypted datasets with unique file names. For example, if the selective dataset encryption program 150 separated dataset_08092022.csv into four separate files where one is unencrypted data is that is not confidential or sensitive and three files are encrypted according to different levels based on their respective confidentiality and/or sensitivity, the selective dataset encryption program 150 may name each file as dataset_Part1_08092022.csv, dataset_Part2_08092022.csv, dataset_Part3_08092022.csv, and dataset_Part4_08092022.csv. The above described naming structure is merely exemplary and any number of naming structures and/or configurations may be implemented to distinguish between the various encrypted datasets.

Next, at 218, the selective dataset encryption program 150 transmits the one or more datasets to cloud storage. The selective dataset encryption program 150 may then transmit the data items to cloud storage through a network, such as WAN 102. The selective dataset encryption program 150 may transmit copies of the encrypted data items or, based on user preconfiguration, the original encrypted data items to cloud-based storage. In at least one embodiment, a decryption key for each group of encrypted data items may also be transmitted, either separately or together with the encrypted data items, to the cloud-based storage device to enable accurate decryption of the encrypted data items.

Then, at 220, the selective dataset encryption program 150 decrypts and ingests the one or more dataset in cloud storage. Each encrypted data item may be received by the selective dataset encryption program 150 in blob storage of a cloud-based storage device, such as remote server 104, public cloud 105, or private cloud 106. Upon receipt by the cloud-based storage device, the selective dataset encryption program 150 may decrypt each group of data items using the respective key for each group.

Upon decryption, the selective dataset encryption program 150 may ingest, or reassemble, the now-decrypted data items into each dataset with which the respective data items were previously located. For example, using the location information tagged to the metadata for each data item when the data item was identified as confidential or sensitive in nature, the selective dataset encryption program 150 may replace the data item to the location from which it was removed in the dataset thereby returning the dataset to its original status before the identification of confidential or sensitive information was performed and data was encrypted in preparation for transmission to cloud-based storage. In at least one embodiment, a data analytics platform may ingest the decrypted data items in order to reassemble the datasets from which they were split prior to encryption. The data analytics platform may before ingestion through either batch ingestion or streaming ingestion.

Figure 3:
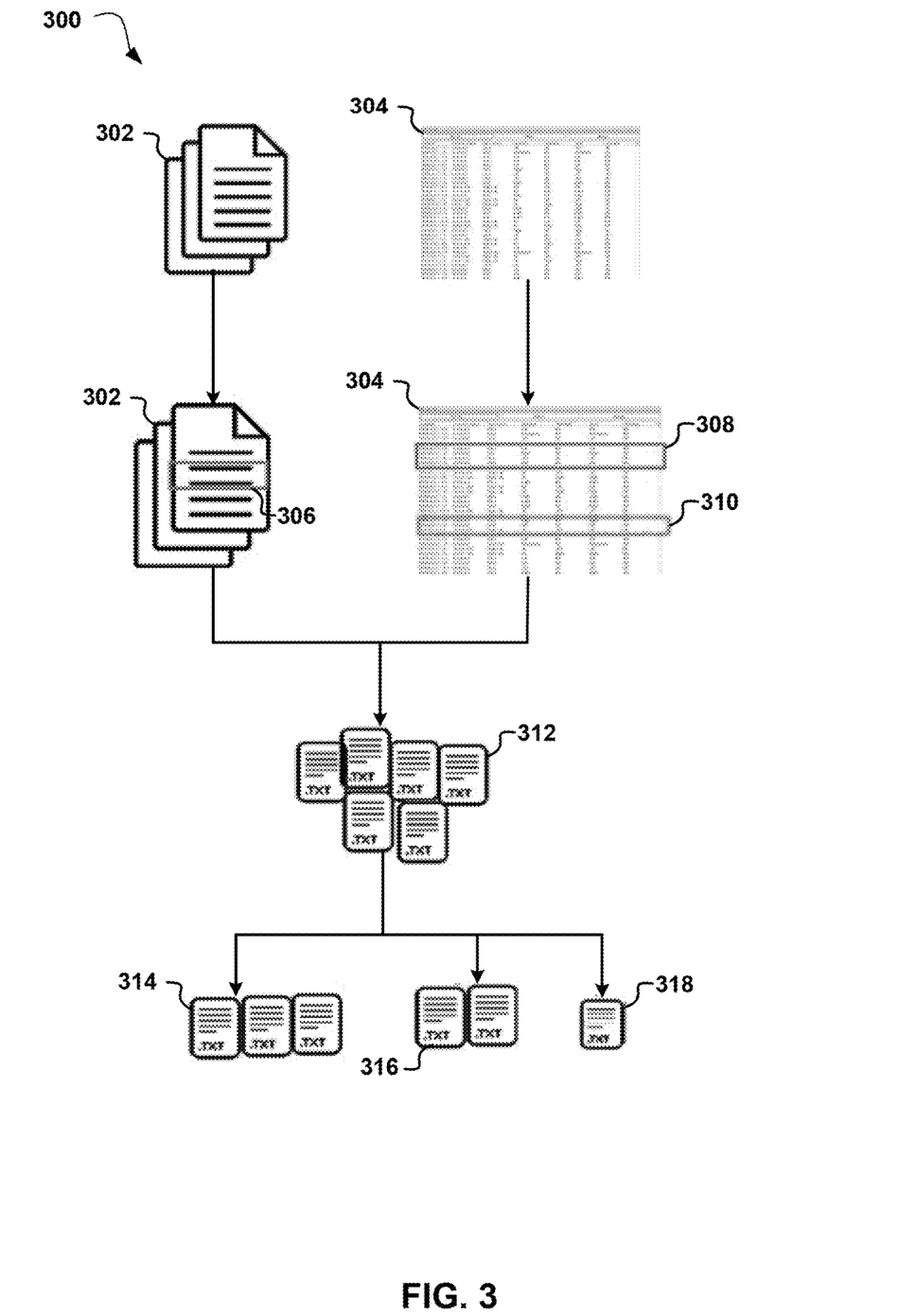
FIG. 3 is an exemplary block diagram of selective data encryption according to at least one embodiment.

Referring now to FIG. 3, an exemplary block diagram of selective dataset encryption 300 according to at least one embodiment. According to at least one embodiment, the selective dataset encryption program 150 may receive instruction, either through manual user interactions or through preconfigurations, that unstructured data 302, such as emails, text files (e.g., word processing documents, spreadsheets, presentation files, and log files), social media data, website data, mobile and/or communication data (e.g., text messages, phone recordings, collaboration software, chat messages, and instant messages), and media data (e.g., digital photos, audio data, and video files) and structured data 304, is to be uploaded to cloud-based storage. The selective dataset encryption program 150 may then analyze the unstructured data 302 and structured data 304 for confidential or sensitive data items, such as data item 306 in unstructured data 302 and data items 308 and 310 in structured data 304. The selective dataset encryption program 150 may then remove data item 306 from unstructured data 302 and data items 308 and 310 from structured data 304 and pool all confidential and sensitive data items 312. The confidential and sensitive data items 312 may then be analyzed to determine which encryption method is most appropriate based on the level of confidentiality or sensitivity and various criteria needed for secure encryption. The confidential and/or sensitive data items 312 may be split into various subsets 314-318 based on the type of encryption to be performed on each subset. Thereafter, the determined encryption method may be performed on the respective subset of confidential and/or sensitive data items.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   identifying, by a processor, one or more unencrypted data items within one or more datasets to be moved from storage in a network attached storage system to storage in a cloud-based storage system;
   determining an encryption method to be performed on each unencrypted data item based on a level of confidentiality or sensitivity of each unencrypted data item;
   sorting each unencrypted data item into one or more groups based on the determined encryption method;
   assigning a unique name to each sorted, unencrypted data item in accordance with a preconfigured naming structure; and
   performing each determined encryption method to a corresponding group within the one or more groups.

2. The method of claim 1, wherein the identifying further comprises:
   tagging metadata associated with each data item with a location of the data item within an unencrypted dataset within the one or more datasets; and
   extracting each data item from the the unencrypted dataset.

3. The method of claim 2, further comprising:
   transmitting each encrypted group to the cloud-based storage;
   performing a decryption method corresponding to each encryption method for each group; and
   inserting each data item from each decrypted group based on the location within the tagged metadata.

4. The method of claim 3, wherein each encrypted group is transmitted with a corresponding decryption key.

5. The method of claim 1, wherein the encryption method is further determined by one or more criteria selected from a group consisting of performance limitations of each encryption method in relation to the unencrypted data items to be encrypted, legal or industrial regulations that require certain methods of encryption, and individual user preferences and preconfigurations.

6. The method of claim 1, further comprising:
   identifying the level of confidentiality or sensitivity of each unencrypted data item through an extraction engine using natural language processing and/or tag-based identification.

7. The method of claim 1, wherein the identifying is triggered upon one or more user interactions with a graphical user interface or by expiration of a preconfigured time period.

8. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying, by a processor, one or more unencrypted data items within one or more datasets to be moved from storage in a network attached storage system to storage in a cloud-based storage system;
   determining an encryption method to be performed on each unencrypted data item based on a level of confidentiality or sensitivity of each unencrypted data item;
   sorting each unencrypted data item into one or more groups based on the determined encryption method;
   assigning a unique name to each sorted, unencrypted data item in accordance with a preconfigured naming structure; and
   performing each determined encryption method to a corresponding group within the one or more groups.

9. The computer system of claim 8, wherein the identifying further comprises:
   tagging metadata associated with each data item with a location of the data item within an unencrypted dataset within the one or more datasets; and
   extracting each data item from the the unencrypted dataset.

10. The computer system of claim 9, further comprising:
    transmitting each encrypted group to the cloud-based storage;
    performing a decryption method corresponding to each encryption method for each group; and
    inserting each data item from each decrypted group based on the location within the tagged metadata.

11. The computer system of claim 10, wherein each encrypted group is transmitted with a corresponding decryption key.

12. The computer system of claim 8, wherein the encryption method is further determined by one or more criteria selected from a group consisting of performance limitations of each encryption method in relation to the unencrypted data items to be encrypted, legal or industrial regulations that require certain methods of encryption, and individual user preferences and preconfigurations.

13. The computer system of claim 8, further comprising:
    identifying the level of confidentiality or sensitivity of each unencrypted data item through an extraction engine using natural language processing and/or tag-based identification.

14. The computer system of claim 8, wherein the identifying is triggered upon one or more user interactions with a graphical user interface or by expiration of a preconfigured time period.

15. A computer program product, the computer program product comprising:
    one or more computer-readable tangible storage medium and program instructions stored on at least one of the one or more tangible storage medium, the program instructions executable by a processor capable of performing a method, the method comprising:
    identifying, by a processor, one or more unencrypted data items within one or more datasets to be moved from storage in a network attached storage system to storage in a cloud-based storage system;
    determining an encryption method to be performed on each unencrypted data item based on a level of confidentiality or sensitivity of each unencrypted data item;
    sorting each unencrypted data item into one or more groups based on the determined encryption method;
    assigning a unique name to each sorted, unencrypted data item in accordance with a preconfigured naming structure; and
    performing each determined encryption method to a corresponding group within the one or more groups.

16. The computer program product of claim 15, wherein the identifying further comprises:

tagging metadata associated with each data item with a location of the data item within an unencrypted dataset within the one or more datasets; and extracting each data item from the the unencrypted dataset.

17. The computer program product of claim 16, further comprising:
    transmitting each encrypted group to the cloud-based storage;
    performing a decryption method corresponding to each encryption method for each group; and
    inserting each data item from each decrypted group based on the location within the tagged metadata.

18. The computer program product of claim 17, wherein each encrypted group is transmitted with a corresponding decryption key.

19. The computer program product of claim 15, wherein the encryption method is further determined by one or more criteria selected from a group consisting of performance limitations of each encryption method in relation to the unencrypted data items to be encrypted, legal or industrial regulations that require certain methods of encryption, and individual user preferences and preconfigurations.

20. The computer program product of claim 15, further comprising:
    identifying the level of confidentiality or sensitivity of each unencrypted data item through an extraction engine using natural language processing and/or tag-based identification.

* * * * *